United States Patent
Rachlin

(10) Patent No.: US 7,386,612 B2
(45) Date of Patent: Jun. 10, 2008

(54) METHOD AND APPARATUS FOR DISAMBIGUATING TRANSMIT-BY-EXCEPTION TELEMETRY FROM A MULTI-PATH, MULTI-TIER NETWORK

(75) Inventor: Elliott H. Rachlin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 919 days.

(21) Appl. No.: 10/465,415

(22) Filed: Jun. 18, 2003

(65) Prior Publication Data

US 2005/0021632 A1    Jan. 27, 2005

(51) Int. Cl.
G06F 15/173   (2006.01)
H04L 12/26   (2006.01)

(52) U.S. Cl. ............... 709/224; 370/241; 370/248; 370/252

(58) Field of Classification Search ........ 709/220–226; 370/248, 252, 254, 400
See application file for complete search history.

(56) References Cited

U.S. PATENT DOCUMENTS

| | | | |
|---|---|---|---|
| 4,875,208 A | 10/1989 | Furuhashi et al. | |
| 5,115,433 A | 5/1992 | Baran et al. | |
| 5,369,784 A | 11/1994 | Nelson | |
| 5,467,345 A | 11/1995 | Cutler, Jr. et al. | |
| 5,572,512 A | 11/1996 | Cutler, Jr. et al. | |
| 5,751,965 A | 5/1998 | Mayo et al. | |
| 5,933,416 A | 8/1999 | Schenkel et al. | |
| 6,083,248 A | 7/2000 | Thompson | |
| 6,271,845 B1 | 8/2001 | Richardson | |
| 6,338,011 B1 | 1/2002 | Furst et al. | |
| 6,381,649 B1 | 4/2002 | Carlson | |

(Continued)

FOREIGN PATENT DOCUMENTS

EP    1211845 A    6/2002

(Continued)

OTHER PUBLICATIONS

D. Abbott et al., Development and Evaluation of Sensor Concepts for Ageless Aerospace Vehicles. Development of Concepts for an Intelligent Sensing System. NASA technical report NASA/CR-2002-211773, Langley Research Center, Hampton, Virginia, 2002.*

Primary Examiner—Krisna Lim
Assistant Examiner—Brendan Y. Higa
(74) Attorney, Agent, or Firm—Fogg & Powers, LLC

(57) ABSTRACT

An apparatus and methods for disambiguating data elements transmitted by exception over a multi-path, multi-tiered communications network of nodes from at least one originating node to a destination node. A method includes the steps of receiving counter data from each node operable to originate data elements, receiving a data element name, evaluating counter data from nodes forming at least one possible path between the named data element's originating node and said destination node; and indicating as unambiguous data associated with the data element name if each of the nodes forming the possible path are transmitting counter data to the destination node. The apparatus includes a processor coupled to the destination node and to a source of data element names, a memory containing a path database and instructions for searching the database for paths of the named data element and to update the database with data relating to counter data reception.

35 Claims, 7 Drawing Sheets

U.S. PATENT DOCUMENTS

| | | |
|---|---|---|
| 6,393,432 B1 | 5/2002 | Flansburg et al. |
| 6,466,138 B1 | 10/2002 | Partyka |
| 6,487,604 B1 | 11/2002 | Rochford et al. |
| 6,632,032 B1 | 10/2003 | Dombrowski et al. |
| 6,711,137 B1 * | 3/2004 | Klassen et al. ............ 370/252 |
| 6,728,216 B1 * | 4/2004 | Sterner ....................... 370/252 |
| 6,952,396 B1 | 10/2005 | Cottreau et al. |
| 7,137,035 B2 * | 11/2006 | Sato et al. .................... 714/25 |
| 2001/0028313 A1 | 10/2001 | McDonnell et al. |
| 2002/0161751 A1 | 10/2002 | Mulgund et al. |
| 2004/0205699 A1 | 10/2004 | Keim et al. |
| 2004/0205713 A1 | 10/2004 | Keim et al. |
| 2004/0225958 A1 | 11/2004 | Halpert et al. |
| 2004/0257243 A1 | 12/2004 | Rachlin |
| 2005/0021632 A1 | 1/2005 | Rachlin |

FOREIGN PATENT DOCUMENTS

EP        1211845 A2 *   6/2002

* cited by examiner

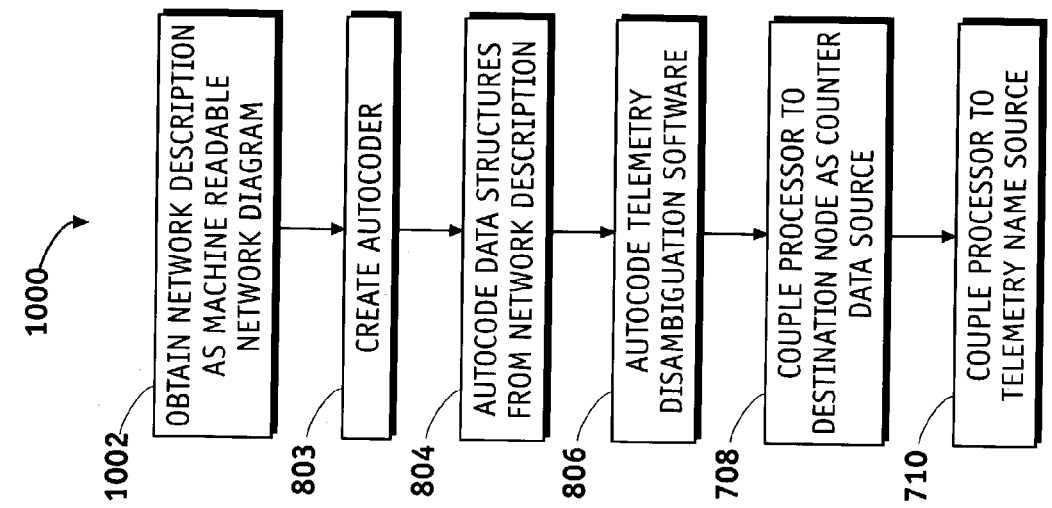
FIG. 9
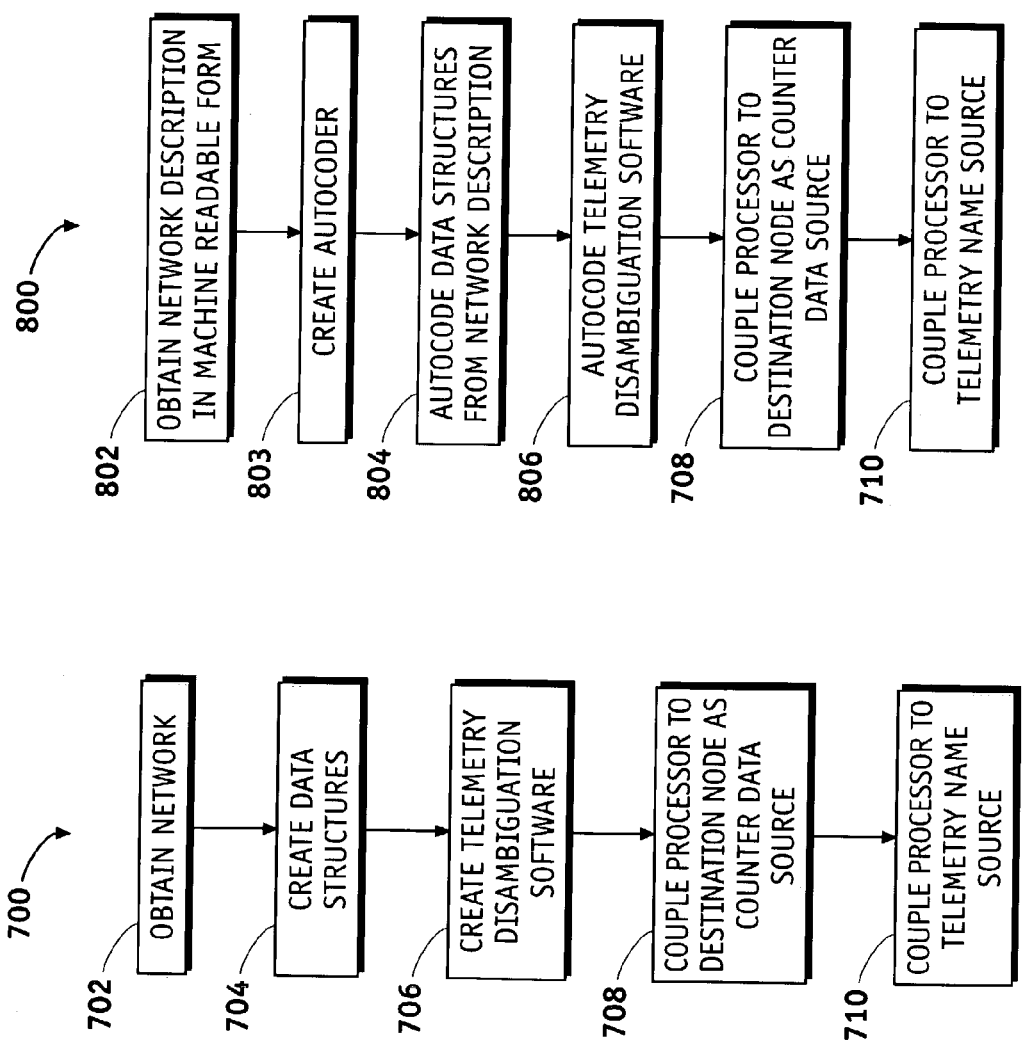
FIG. 8
FIG. 7

METHOD AND APPARATUS FOR DISAMBIGUATING TRANSMIT-BY-EXCEPTION TELEMETRY FROM A MULTI-PATH, MULTI-TIER NETWORK

FIELD OF THE INVENTION

The present invention generally relates to telemetry data processing, and more particularly relates to a method and apparatus for disambiguating, at high average temporal resolution, transmit-by-exception telemetry sent over a multi-path, multi-nodal network.

BACKGROUND OF THE INVENTION

Some aerospace systems, such as the International Space Station (ISS) and the Space Transportation System (STS), or Space Shuttle, produce large volumes of telemetry which must be transmitted to terrestrial stations for use by mission controllers and vehicle health managers, among others. The transmission occurs over multi-nodal, multi-tiered networks which include nodes within and exterior to the space vehicles. Because bandwidth for transmitting the telemetry data is limited, various approaches to bandwidth compression have been attempted, one of which is the transmit-by-exception approach.

In a transmit-by-exception telemetry data transfer, the only data transmitted are those telemetry values which have undergone a significant change since they were last transmitted. This approach can provide substantial bandwidth compression. A resulting difficulty, however, is that the user on the ground cannot tell the difference between data that is not changing because it has not required transmission and data that is not changing because some portion of the network is malfunctioning. Network anomalies may be intermittent, making some telemetry faulty and leaving some telemetry valid. Unchanging data is ambiguous at the point of reception as to the cause for the lack of change.

The problem is exacerbated when the telemetry data is to be used in Integrated Vehicle Health Management Systems (IVHMSs). IVHMSs access telemetry data for use by diagnostic and prognostic software to support vehicle health maintenance. Experience has shown that ambiguous telemetry data may cause known IVHM algorithms to produce erroneous results.

One approach is to observe a constantly-changing telemetry data element, or counter, transmitted from the same source node as the transmit-by-exception data to be disambiguated, or target data. The target data may be evaluated as valid if the frequently-changing telemetry data element is seen to change over the time period when the target data was sent. The approach has several weaknesses. First, in a multi-path, multi-tiered communications network signal noise can cause false data values in the counter data, leading an algorithm to conclude that the counter is operating when, in fact, it is not operating. Thus, target data that is invalid may be erroneously seen as valid.

Second, counters that change at different rates on different nodes are utilized. The temporal resolution of a pairing disambiguation scheme for an individual node is the period of that node's counter minus the pulse width of the data bit. The temporal resolution of the disambiguation scheme for the network as a whole is the resolution of the slowest counter in the network. The temporal resolution for the network as a whole matters because IVHM systems need a series of complete "snapshots" of the vehicle system that give, as closely as possible, the state of the vehicle at particular times. If some of the data has gone bad without notice, the snapshots will be flawed and the IVHM system will reach an erroneous conclusion.

Designers and operators of large networks such as those used with ISS and STS often use their own commercial-off-the-shelf (COTS) equipment. Counters of different frequencies are inevitable, and the counter frequency for a particular node may be selected based upon vendor-unique or situational criteria rather than a desire for uniformity. Ideally, each node might be equipped with a high-speed clock, but this would quickly recreate the bandwidth-saturation problem that transmit-by-exception telemetry was designed to solve. For some existing networks, retrofitting each network node with a counter would be impractical. If one counter in a network operates at a frequency of 0.1 Hz, it could be nearly 10 seconds before a problem becomes apparent. Disambiguation schemes with low temporal resolutions are problematic in IVHM systems, so the pairing approach is rejected.

Networks are reconfigurable by nature, making the process of tracking network health an expensive and energetic undertaking. For example, whenever a new module is added to the ISS, at least one sub-net must be added to the network and new telemetry points must be added. The same may be true for additions, such as a robotic arm, incorporated into an STS.

Accordingly, it is desirable to disambiguate transmit-by-exception telemetry to improve the performance of IVHM and other systems. It is therefore desired to avoid poor temporal resolution and noise-induced false validations. In addition, it is desirable to provide a user-friendly process of providing telemetry disambiguation that is adaptable to changes in the structure of the network and the set of telemetry variables sent over the network. Avoiding physical upgrades to existing network equipment while creating the desirable features just mentioned is also desirable. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for disambiguating data, including telemetry data, transmitted by exception over a multi-path, multi-tier network to a destination node. The apparatus comprises a counter in each relay node and each telemetry source node of the network, each counter in each operable node transmitting a unique, periodically-changing stream of data, or counter data toward the destination node. The apparatus further comprises a processor, a memory containing a database of paths from each node in the network to the destination node, a set of database search instructions for the processor and a set of database updating instructions for the processor. The processor is coupled to the destination node receiving counter data and to a source of telemetry data names, such as an integrated vehicle health management system.

Given a telemetry data element name, the processor executes the instructions to search the database for possible paths from the node originating the named telemetry point to the destination node. For each of the possible paths in turn, the processor executes instructions to determine the nodes forming the possible path and the counter data name for each counter corresponding to each node in the possible path. The processor then checks each named counter data stream for each node in the possible path and, if each named counter stream is found to be periodically changing, indicates the named telemetry data element to be good-but-unchanging, or unambiguous, data. The temporal resolution of this method for a particular telemetry data element is greater than or equal to the period of the fastest counter in its path and less than or equal to the period of the slowest counter in its path. Overall, the average resolution for any particular telemetry data element and for the sum of all telemetry data elements will be improved compared to a pairing approach. The data disambiguated by the method may be data other than, strictly speaking, telemetry data.

BRIEF DESCRIPTION OF THE DRAWINGS

The present invention will hereinafter be described in conjunction with the following drawing figures, wherein like numerals denote like elements.

FIG. 7 illustrates an exemplary process of making an exemplary apparatus for disambiguating telemetry;

FIG. 8 illustrates an alternate embodiment of an exemplary process of making an exemplary apparatus for disambiguating telemetry; and FIG. 9 illustrates an alternate embodiment of an exemplary process of making an exemplary apparatus for disambiguating telemetry.

DETAILED DESCRIPTION OF THE INVENTION

Figure 1:
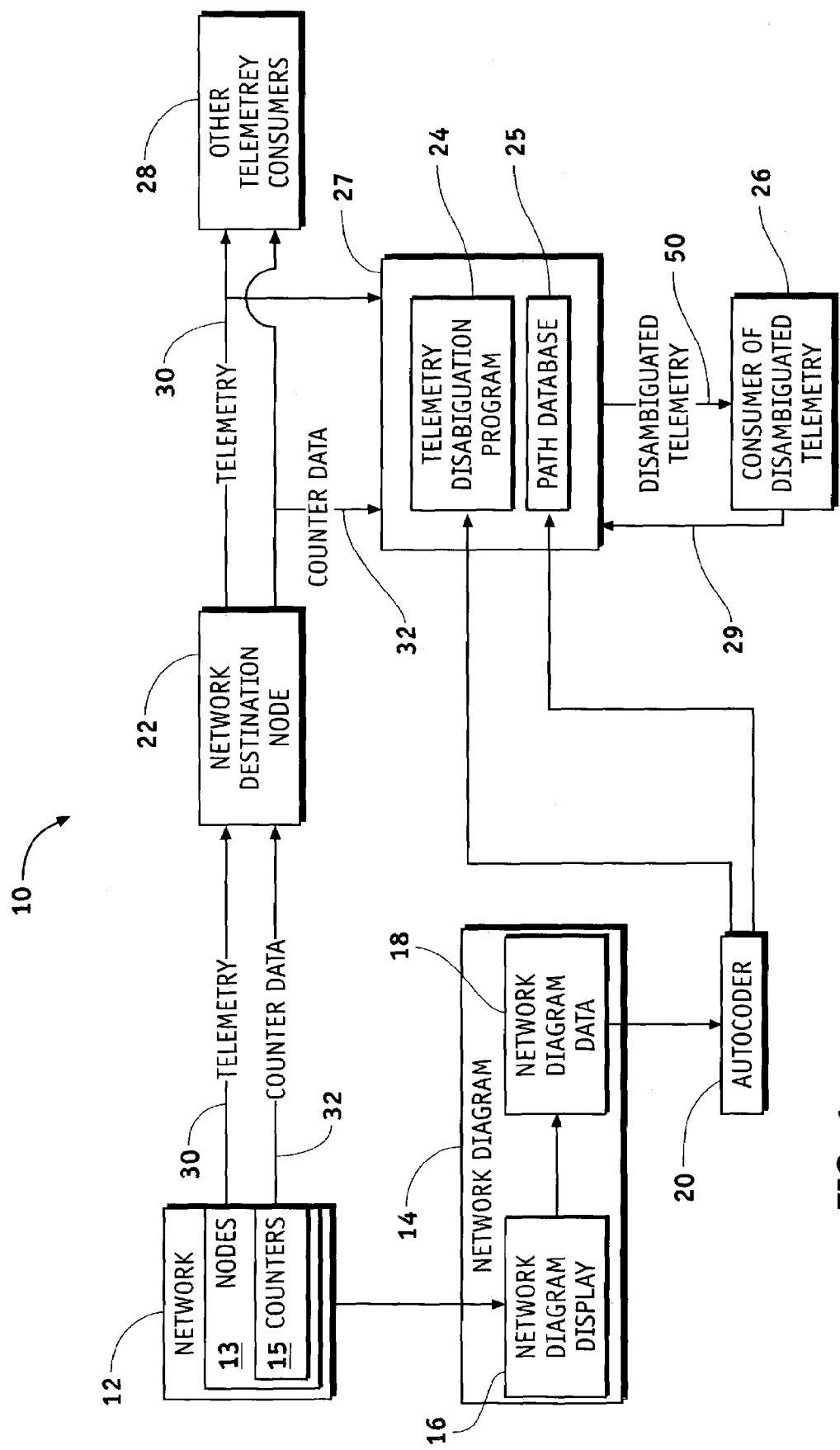
FIG. 1 illustrates a diagram of an exemplary apparatus for disambiguating telemetry.

The following detailed description of the invention is merely exemplary in nature and is not intended to limit the invention or the application and uses of the invention. Furthermore, there is no intention to be bound by any theory presented in the preceding background of the invention or the following detailed description of the invention. Referring to FIG. 1, the apparatus 10 for disambiguating telemetry comprises a processor 27 operable to execute processor instructions such as telemetry disambiguating computer program 24. Computer program 24 may be written in a conventional way, autocoded (see 20) from a computer-generated network diagram 14, as disclosed in U.S. patent application Ser. No. 10/465,411, entitled METHOD AND APPARATUS FOR CONVERTING A NETWORK DESCRIPTION INTO A COMPUTER PROGRAM FOR DISAMBIGUATING TRANSMIT-BY-EXCEPTION TELEMETRY FROM A MULTI-PATH, MULTI-TIER NETWORK, (the '411 Application), or autocoded from other sources of network data. The present invention contemplates various methods by which computer program 24 is created. The method for creating computer program 24 in FIG. 1 is merely exemplary. Computer program 24 enables processor 27 to search network data structure, or path database, 25 for possible paths to the destination node 22 from the particular node 13 originating the telemetry data 30 element named 29 by consumer 26.

Telemetry data 30 comprises a plurality of telemetry data elements, each having a name and a variable value. Computer program 24 may be responsive to counter data 32 from the network 12 and at least one telemetry data element name 29 from consumer 26 to disambiguate the telemetry data 30 element named by the consumer 26. The apparatus 10 may include the counters 15 in the network nodes 13, wherein each counter produces one data stream of counter data 32. In most embodiments, counter data 32 may originate from a dedicated counter associated with each network node 13. However, in some alternate embodiments, such counters may be an existing telemetry data 30 element selected for the periodic nature of the data produced.

Computer program 24 searches a path database 25 for possible paths from the node 13 which originates the telemetry data 30 element associated with the telemetry data element name 29 supplied by the consumer 26. The path database 25 may be created in a conventional way and form, may be autocoded from network diagram data 18 as disclosed in the '411 or may be autocoded from other sources of network data. The present invention contemplates a variety of methods of forming path database 25 and of structuring path database 25. A possible structure is disclosed in co-pending U.S. patent application Ser. No. 10/465,414, entitled METHOD AND APPARATUS FOR STORING AND RETRIEVING DATA RELATED TO PATHS OF A MULTI-PATH, MULTI-TIER NETWORK. In most embodiments, the path database 25 will be compiled with telemetry disambiguation program 24 to maximize speed of data access.

The apparatus 10 may be disposed in streams of telemetry data 30 and counter data 32 from a network destination node 22 to a particular consumer 26 of disambiguated telemetry. In an alternate embodiment, the apparatus 10 may be interposed between a network ground node 22 and a telemetry distribution node (not shown) to provide disambiguated telemetry to all telemetry consumers 26 and 28.

Figure 2:
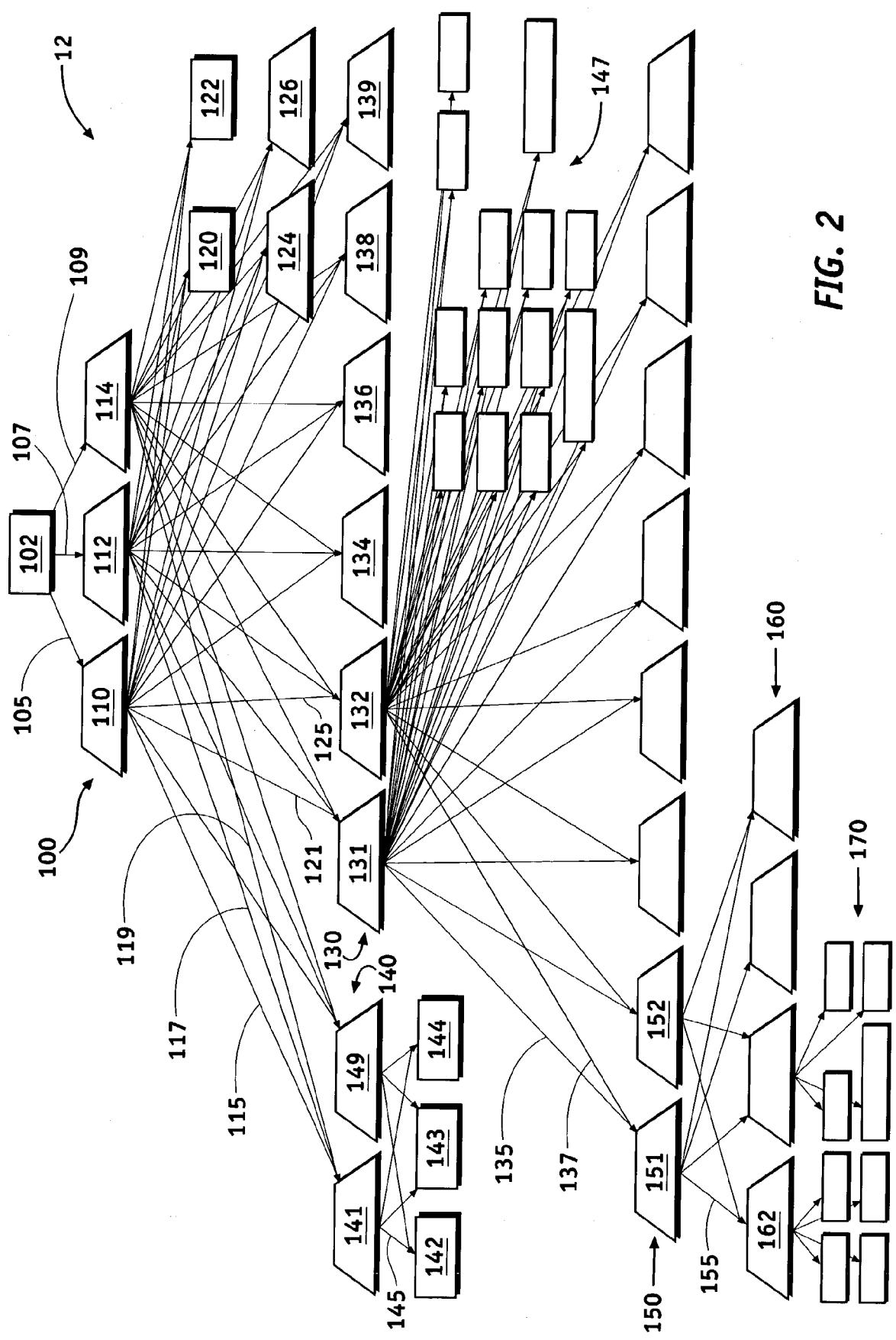
FIG. 2 illustrates a portion of an exemplary network.

FIG. 2 shows an exemplary network 12 over which telemetry data is sent by exception. The network 12 comprises relay node icons (e.g. 110 and 131) shown having a first shape exemplified by a trapezoid, telemetry source node icons (e.g. 120, 122, all of 147) illustrated having a second shape exemplified by a rectangle, and link icons (e.g. 115, 135, 145, 155 and many unlabeled) illustrated having a third shape exemplified as arrows.

Representative relay node 131 may be capable of multiple functions. Relay node 131 may receive telemetry data 30 from other relay nodes, such as 151 and 152, and transmit what it received to a node 110, 112, or 114 in a higher tier 100. Relay node 131 can receive telemetry data 30 and counter data 32 from telemetry source nodes 147 and transmit that telemetry data 30 and counter data 32 to a node 110, 112, or 114 in a higher tier 100. Relay node 131 may generate telemetry data 30 inside itself and send that data to the destination node 102. Relay node 131 may also generate counter data 32, which is a stream of constantly changing data. A data stream is considered "constantly changing" if it changes periodically. Preferably, counter data 32 changes at least as often as the corresponding telemetry data 30 is scheduled to be sent from a common originating node 131.

Telemetry source nodes 120, 122, 142-144, 147, and 170 are sources of telemetry data 30 and also sources of counter data 32. Telemetry source nodes 120, 122, 142-144, 147, and 170 do not perform relay functions. Telemetry source nodes 120, 122, 142-144, 147, and 170 are linked to at least one relay node (e.g. 131). Each link (e.g., 145) connects exactly two nodes (e.g. 141 and 142) and each link may be uniquely identified. A preferred method for link identification is by ordered source node and destination node pairs. For example, a unique identifier for link 145 would be {142, 141}. Links in the embodiment shown in FIG. 2 are illustrated with arrows pointing to a data source.

The network 12 represents a multi-path, multi-tiered network 12. The network 12 is multi-path because there may be more than one way to get from a given node to destination node 102. For example, data may move from any of telemetry source nodes 147 through either of relay nodes 131 and 132, and through any of relay nodes 110, 112, and 114 to destination node 102. Network 12 is considered "multi-tiered" because it has multiple layers, or tiers 100, 130, 140, 150, and 160. The first, highest, tier comprises all nodes directly connected to the destination node 102. The next, lower, tier comprises all nodes directly connected to first tier nodes, etc. Connections between nodes, such as links 115, 117, and 119, may be via wire, radio frequency, laser, fiber optic, or similar known type of communication channel.

The tiers may correspond to physical relationships of node-bearing components in the network 12. Network 12 may have sub-networks added to it from time to time. For example, the addition of a new module to the ISS brings with it a subnet of telemetry source nodes, links, and relay nodes which must be integrated into the pre-existing network 12. Tier 140 is suggestive of an added subnet.

Figure 3:
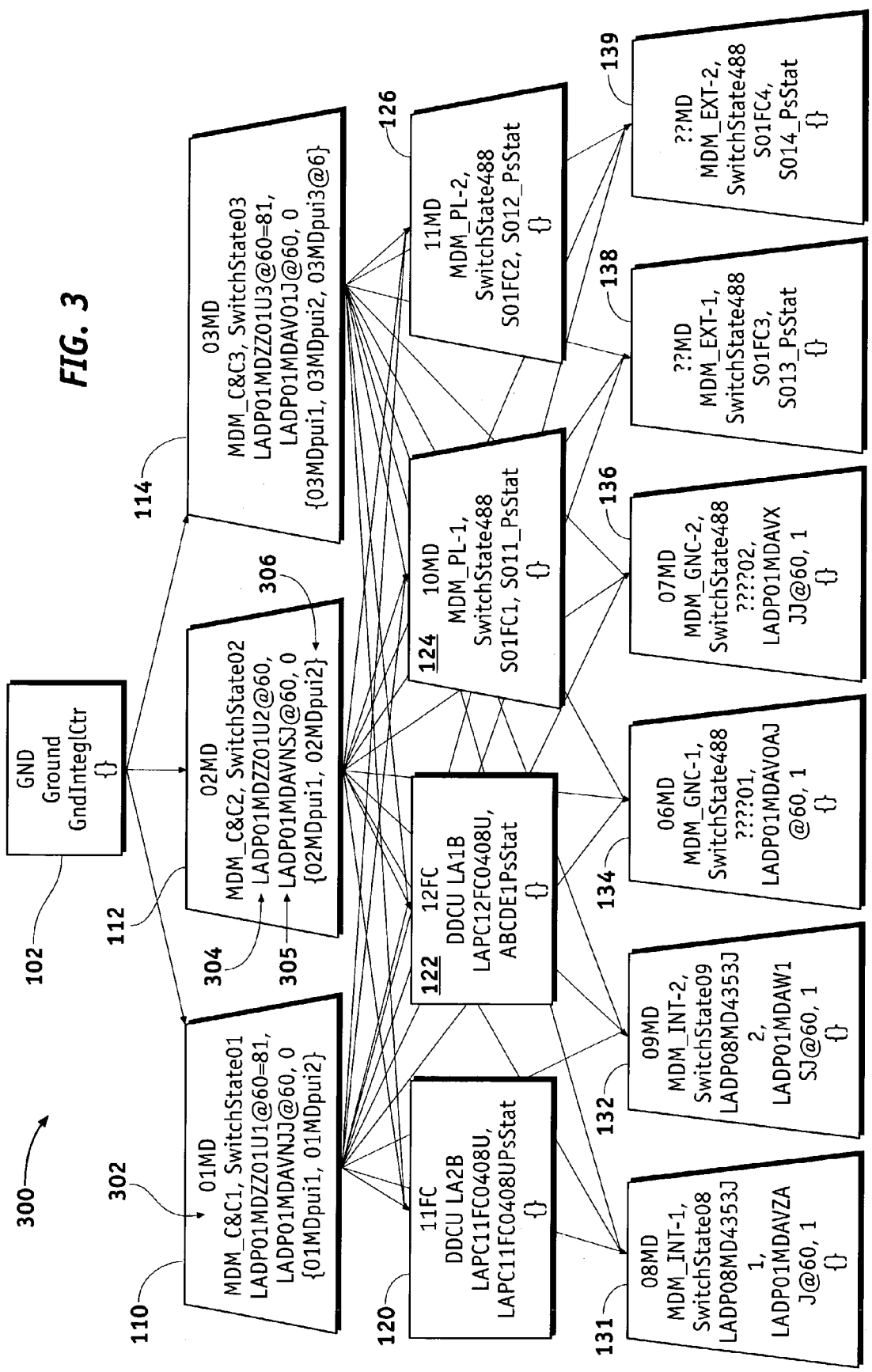
FIG. 3 illustrates details of a section of the exemplary network of FIG. 2, with associated data.

Referring also to FIGS. 1 and 2, FIG. 3 shows a detailed view of a section 300 of the network 12. Each node has telemetry data element names 306 and other text data 302 associated with it, which could not be shown in FIG. 2, but which may occur with all nodes 13 (FIG. 1). The text data may be associated with the node in a path database 25. For example, associating a counter name 304 with a node in the path database 25 allows the counter name for a given node to be quickly identified. The data relates to the node 13, the network 12, and the data 30 and 32 transferred over the network 12 from the corresponding node 13.

Figure 4:
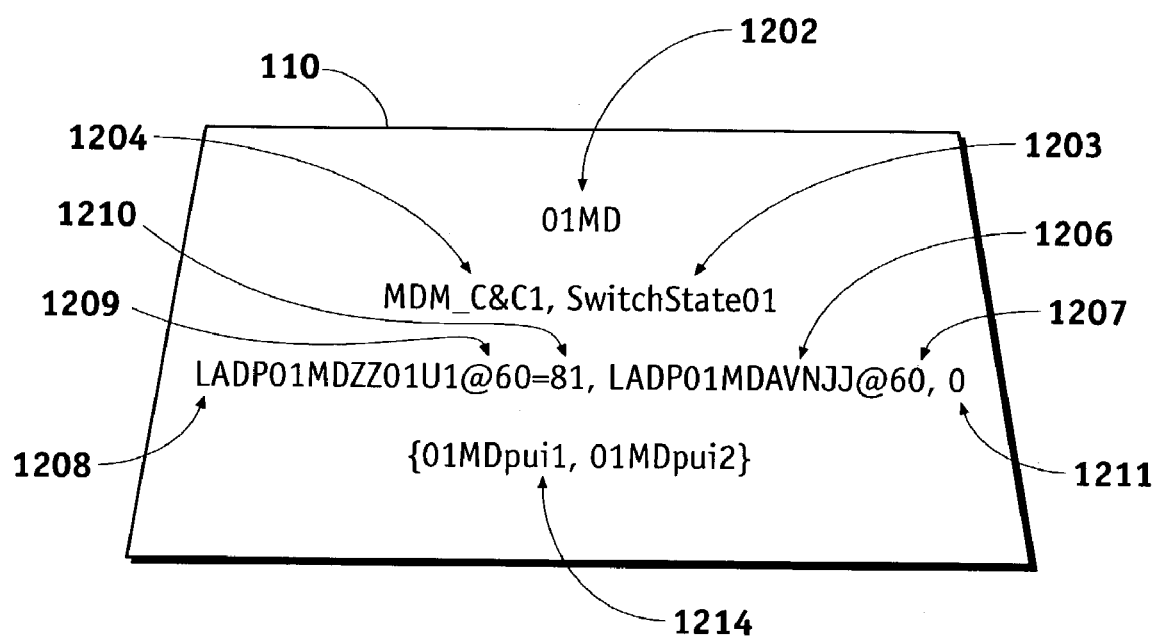
FIG. 4 illustrates details of a relay node icon of the exemplary network of FIG. 2, with associated data.

Referring additionally to FIG. 4, the first text string data associated with node 110, "01MD" represents a unique node identifier 1202, used to differentiate relay node 110 from all other relay nodes. Text string data 1204 relates to a name for the node 110. "MDM_C&C1" for example, is the box name for a "Multiplexer-DeMultiplexer_Command and Control 1" relay node 110. The switch state variable name 1203 is an example of text string data which may be associated with a node in a path database 25 (FIG. 1), although not directly related to telemetry disambiguation. The path database 25 may have a variety of uses in network analysis and additional data may be associated with nodes 13 to serve the additional uses. In this example, switch state variable names 1203 have a one-to-one correspondence with relay nodes, permitting node status to be quickly searched by any telemetry consumer 26 having the switch state name 1203 of the node. Text string data 1208 shows a variable name "LADP01MDZZ01U1" for the counter uniquely associated with relay node 110. For simplicity, the counter name used may be the same as the telemetry variable name used in other processing of the telemetry. In an alternate embodiment, the variable names may be unique within the telemetry disambiguation software and a translation to external names may be added. The frequency of counter LADP01MDZZ01U1 is made explicit by a text string 1209 which designates an update frequency of the counter data 32. For example, text data string 1209, "@60", indicates the counter changes 60 times per minute. A format indicator for counter data 32 from counter LADP01MDZZ01U1 may be designated by a text data string 1210 as, for example, "=81." Default values for frequency and format may be set and relied upon.

Another specialized telemetry data element associated with data flow control is named "LADP01MDAVNJJ" in text data string 1206. LADP01MDAVNJJ is the primary/secondary process unique identifier (PUI) for node 110. The primary/secondary PUI contains a value indicating whether node 110 is in a primary or secondary mode. The primary/secondary status indicator may operate as an on/off switch for the node 110. In primary status, the node 110 sends and relays data to the destination node 102. In secondary status, the node 110 does not send or relay data to the destination node 102. The primary/secondary PUI text data string 1206 contains an update rate substring 1207. Not all relay nodes have primary/secondary PUIs. Those relay nodes which do have primary/secondary PUIs may also have a primary enumeration code 1211. Primary enumeration code 1211 contains the value which the associated primary/secondary PUI uses to indicate primary mode. This is required in a heterogeneous network where nodes manufactured by different entities use different primary/secondary PUI values to indicate primary status.

The present invention allows additional data to be associated with each node 13 associated with the path database 25 for any purpose. Network analysis tools based upon other data associated with network nodes 13 may be readily developed. List 1214 of telemetry data element names "01MDpui1" and "01MDpui2" identifies telemetry data elements which may not be associated with data flow control and which originate from the relay node 110, itself.

A unique identifier is a unique name, and a PUI is a name for a data element or stream having a name associated with it. PUI may encompass more named data streams than a strict interpretation of "telemetry" might support, such as data regarding experimental packages onboard the vehicle. Herein, "PUI", "telemetry data element name", "data element name", and "data name" all refer to unique identifiers of data streams being sent over the network. "PUI" is also used to refer to both the name of data and the named data.

Telemetry data source nodes 120 and 122 also have associated text data strings. The text strings may be adapted for the convenience of a user. For example, each telemetry data source node may have an associated counter name ending in "U" and a status indicator ending in "Stat." Other consistent naming schemes may be used. In an alternate embodiment, links may have associated text data strings. Text data strings such as 1202 and 1208 may become data stored in the path database 25.

Telemetry disambiguating program 24 may be produced by simply printing the predetermined text of it to a file. That is, the division of functionality between telemetry disambiguating program 24 and path database 25 are preferably such that only the database 25 changes when the structure or status of the network 12 changes. Telemetry disambiguating program 24 may be responsive to an input of a specific telemetry data element name to search for all possible paths from the telemetry data source node where the named telemetry data element originates to the destination node 102. Each path comprises an ordered linear sequence of linked nodes. The processor 27 uses program 24 to check the counter data 32 of each node of each possible path to find if there is any path having all nodes in an operating status. The program 24 may stop searching when it finds a first good path. If one path exists in which all nodes are operating, the input telemetry data element is known to be good-butunchanging, and so is no longer ambiguous. The program 24 accesses the path database 25 in searching each possible path. The path database 25, or network data structures 25, contain data describing all designed paths from each node to the destination node 102.

Figure 5:
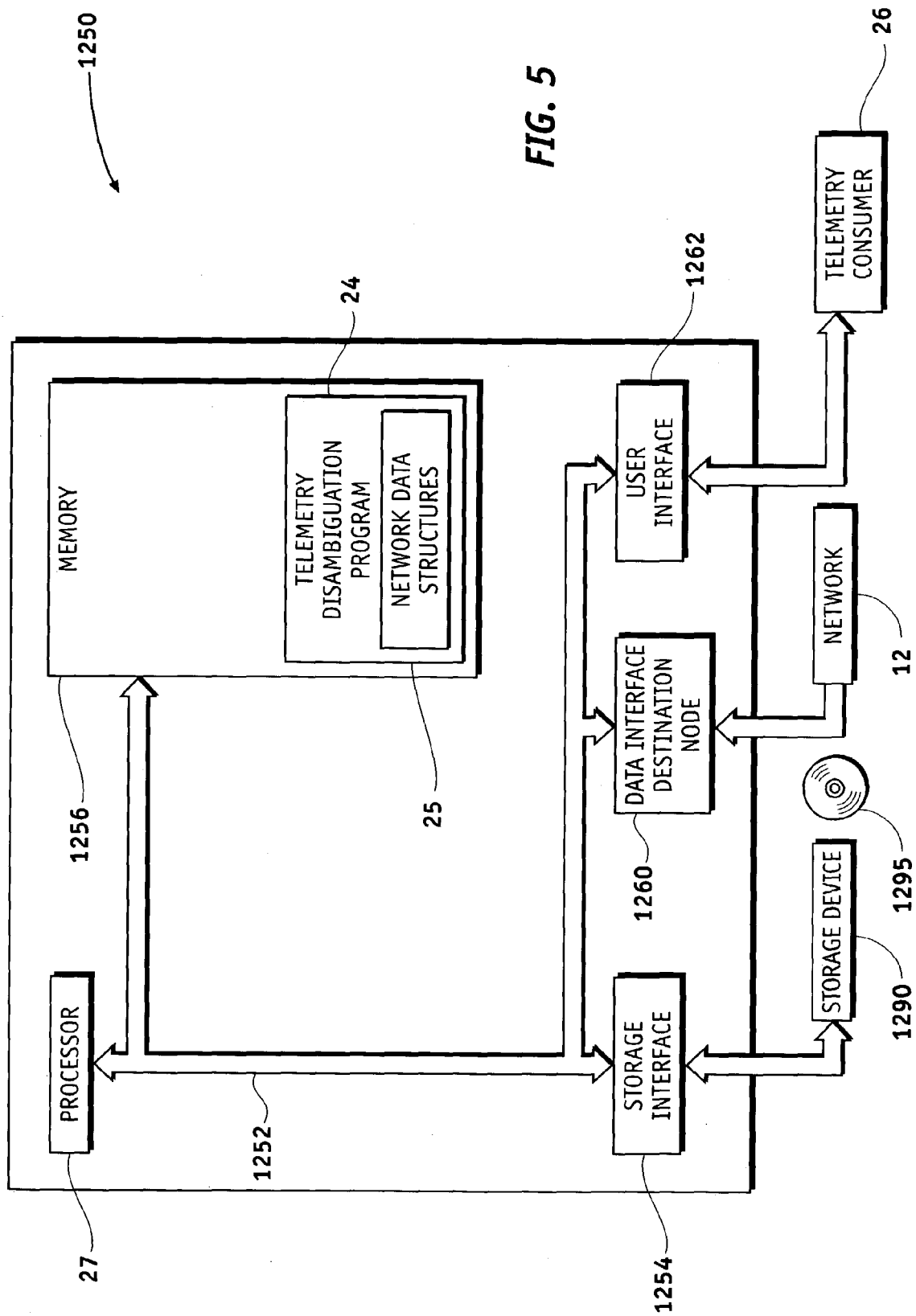
FIG. 5 illustrates a diagram of another exemplary apparatus for disambiguating telemetry.

FIG. 5 shows a second exemplary embodiment of a telemetry disambiguation apparatus 1250. The apparatus 1250 comprises a processor 27 communicating with a memory 1256 over a data bus 1252 in computer 1006. Processor 1258 further communicates over bus 1252 with storage interface 1254, data interface 1260, and user interface 1262. Storage interface 1254 provides read and write access to storage device 1290 comprising machine readable media, which may include removable machine-readable media 1295. The data interface 1260 provides access to data 30 and 32 (FIG. 1) arriving at the destination node 102 (FIG. 2) of network 12 (FIG. 1). User interface 1262 provides interactive access to consumers of disambiguated telemetry 26 (FIG. 1), such as an IVHM system, as well as programmers and database administrators.

Memory 1256 contains network data structures 25, or path database 25, which may contains every path from each node to the destination node 102 for at least a defined subset of a network 12. Memory 1256 also contains the telemetry disambiguation program 24. In most embodiments, the telemetry disambiguation program 24 code is pre-determined and merely needs to be printed to a file for compilation. In some embodiments, a file containing compilable telemetry disambiguation program 24 code may be supplied. The network data structures 25 and the telemetry disambiguation program 24 code may be compiled together to form the telemetry disambiguation program 24.

Telemetry disambiguation program 24 is operable to receive inputs from two sources. First, counter data 32 (FIG. 1) from destination node 102 (FIG. 2) of network 12 (FIG. 1) crosses the data interface 1260 and communicates over the bus 1252 to processor 27. Counter data 32 may be analyzed by processor instructions operable to update the network data structures 25 with an indicator of node operability. The routine may be in the telemetry disambiguation program 24 or may be independently located in memory. The indicator of node operability placed in network data structures 25 may be associated with a node identifier or with a link associated with the node originating the counter. If the counter data 32 (FIG. 1) from a particular node is changing, that node is considered operable and the indicator of node operability for that node is set to indicate that status. Otherwise, the indicator of node operability for that node is set to indicate that the particular node is inoperable. For an unusual embodiment having a node without a counter, the indicator of node operability is set to a constant, preferably indicating the node is operating.

The second input to the telemetry disambiguation program 24 arrives via the user interface 1262 in the form of a PUI, or telemetry data element name, to be disambiguated. The telemetry disambiguation program 24 is responsive to the PUI to search the network data structures 25 for any good path from the PUI's originating node to the destination node 102. If a good path is found, an indicator that the data of the PUI is unambiguous is associated with the PUI. The associated indicator is returned to the consumer 26. When the consumer 26 is an IVHM system, the data of the PUI is then processed by prognostic and diagnostic algorithms to reach a decision regarding changing the state vector of the telemetered vehicle. The output of the IVHM system may be implemented automatically, resulting in a state change of the vehicle. For example, if diagnostic algorithms of the IVHM system determine that an over-temperature condition exists due to sunlight impingement on a component, the IVHM may change the attitude of the vehicle to cool over-temperature component.

Figure 6:
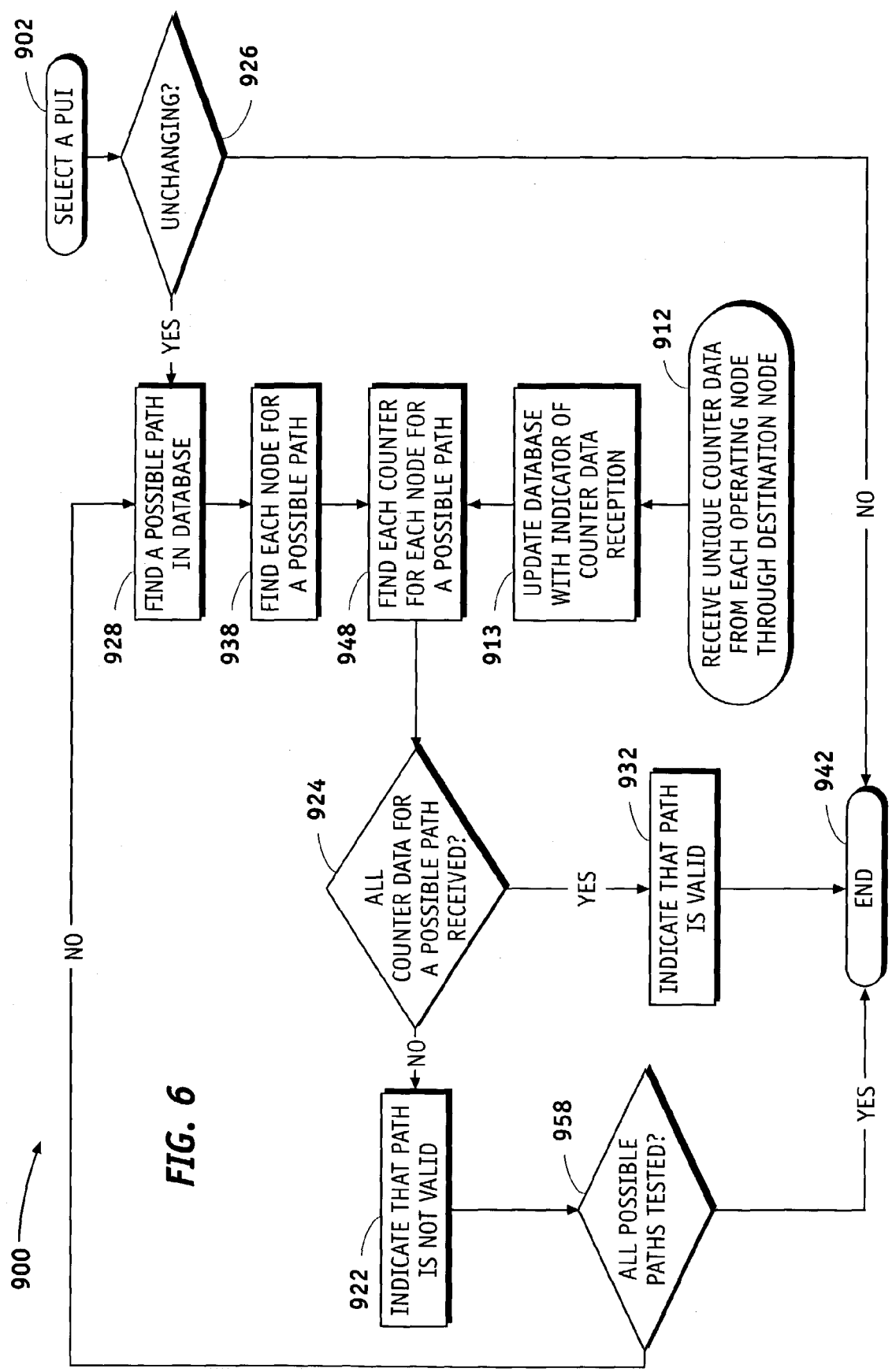
FIG. 6 illustrates a process diagram of an exemplary method of disambiguating telemetry.

FIG. 6 shows an exemplary process flow for the telemetry disambiguation process 900. The process 900 has a starting point at step 902 with the selection of a PUI to disambiguate. If the PUI is found to be changing in step 926, the telemetry is not ambiguous, so the process ends at step 942. In an alternate embodiment, step 926 may be skipped. Otherwise, step 928 begins a path-finding loop for possible paths among the set of all designed paths in network data structures 25 (FIG. 5). When a first possible path is found, step 938 finds each link in the found possible path and step 948 finds the counter data 32 for each node at the source of each link in the path. Preferably, a shortened approach is used, wherein finding a link in step 938 finds an associated indicator of node operability for the node which is the source node of the link, the indicator stored in the network data structures 25, which subsumes step 948. In some embodiments, the paths may be stored in the network data structures 25 as sequences of nodes, rather than as sequences of links.

Step 948 may use indicators of counter data reception, or indicators of node operability, created and stored in step 913 based on counter data 32 received at the destination node in step 912. Step 924 uses counter data 32, or indicators of the status thereof, to determine if the selected PUI is unambiguous. If step 924 finds changing counter data 32, or indicators thereof, for each node in the possible path between the node originating the PUI and the destination node 102, then the path is operational and the PUI is unambiguous, or valid, and is so designated in step 932. If step 924 finds unchanging counter data 32, or indicators thereof, for at least one node in the possible path, indicating that the possible path has a failed node, the path is designated as not valid in step 922. If step 924 finds counter data 32, or indicators thereof, of unknown status for at least one node in the possible path, then the possible path is designated as not valid, in step 922. In an alternate embodiment, step 922 may branch between invalid and unknown path statuses, with the unknown path status being treated differently thereafter. In most embodiments, indicators of counter data 32 are set to unknown prior to each data cycle, so only positively identified counter data 32 statuses can change the node status and path status from "unknown." After determination 922, the path-finding loop will return to step 928 if there are more paths to test 958 or end at step 942 if there are none.

In step 932, the unambiguous nature of the telemetry data may be indicated in any of several ways. One approach is to associate a binary indicator with the telemetry data element name. Another approach is to only send unambiguous data to a consumer 26, such as an IVHMS. Other approaches may be obvious to those of ordinary skill in the art in light of the present disclosure.

FIG. 7 illustrates an exemplary process flow 700 for making an apparatus for disambiguating telemetry data. The process 700 begins by obtaining 702 a network description. A description may include each node, link, counter, and telemetry data element of the network. The description may be in a form readable by machines or by humans. The description obtained in step 702 is used as the basis for step 704, in which network data structures 25 are created and populated with data. The network data structures 25 (FIG. 1) may be of any form that identifies all designed paths of the network, identifies all nodes in each designed path, associates each PUI with its originating node, and identifies a counter for each node. In most embodiments, the network data structures 25 also identify an updatable status of the counter data for each node. In an alternate embodiment, the data structures are obtained.

The network data structures 25 may be searchable and updatable by the telemetry disambiguation software 24 (FIG. 1) created in the next step 706. In some embodiments, updating is done by a separate software program. The telemetry disambiguation software 24 may search based on a PUI name, finding the associated originating node, the associated possible paths from the originating node to the destination node, each node in each possible path, each counter name associated with each node in each possible path, and an indicator of counter data reception associated with each counter name. Step 706 may include compiling network data structures 25 with the searching routines of telemetry disambiguation software 24. The updating software may also be compiled into the telemetry disambiguation software 24 in step 706.

In step 708, the processor on which the telemetry disambiguation software 24 is executed is coupled to the destination node 102 (FIG. 1) of the network 12 to receive counter data 32 from operable nodes. In most embodiments, step 708 comprises creating data communication links between the destination node 102 and the data interface 1260 (FIG. 5). The data communication links may be wireless. The data link created in step 708 supplies counter data 32 for creating indicators of counter data reception, or indicators of node operability, which may be stored in network data structures 25. In most embodiments, the updating of the path database 25 is integral to the telemetry disambiguation software 24. In some other embodiments, the updating process is separate.

Step 710 couples the processor to a source of telemetry names identifying telemetry to be disambiguated. This input source may be another computer program such as an IVHMS, or any other consumer 26 (FIG. 5) of disambiguated telemetry. In most embodiments, step 710 comprises creating data communication links between the telemetry consumer 26 and user interface 1262 (FIG. 5). With the apparatus assembled, the arrival of a telemetry data element name, or PUI, at an input of the telemetry disambiguation software 24 will result in a disambiguation of the data associated with the named data element. The disambiguated data element may then be automatically used by the telemetry consumer 26 as a basis for changing a state vector in a vehicle having an IVHMS, such as an ISS, STS, automobile, boat, or other vehicle. In most embodiments, the apparatus 1250 for disambiguating telemetry will be part of a larger system. In some embodiments, the apparatus 1250 for disambiguating telemetry may be one component of a data conditioning subsystem of an IVHMS.

FIG. 8 shows an alternate embodiment of the process 800 for making an apparatus 1250, wherein step 802 specifies the network description obtained in step 702 (FIG. 7) to be in machine-readable form. The machine readable form may be required for step 803, in which the machine-readable network description is autocoded into network data structures 25. A variety of ways for obtaining a machine-readable version of a network description are contemplated within step 802. For example, the descriptive data may be in a plurality of data files in one or more computers operating or managing network 12, and the necessary data may be extracted from those files, reorganized, and stored. For further example, the data files containing the network description may be files created to represent a network diagram 14 (FIG. 1) of network 12. In yet another example, a hardcopy of a network drawing may be scanned and the scanned images parsed into a network description data file.

In step 803, an autocoder 20 (FIG. 1) is created to translate the network description data into network data structures 25. The autocoder 20 need only be written once, and may be executed each time the network changes. For example, when a new module is added to the ISS, additional data may be added to the network description and autocoded into the network data structures 25 and telemetry disambiguation software 24. In an alternate embodiment, the autocoder 20 is obtained, rather than created. Step 804 executes the autocoder to create network data structures 25 and step 806 executes the autocoder to produce telemetry disambiguation software 24. In most embodiments, steps 804 and 806 occur without a noticeable pause between them. Step 806 may simply print a copy of a pre-determined telemetry disambiguation program 24. Step 804 may create and populate the path database 25 responsive to the network description Step 804 includes the steps of finding all designed paths through the network from each node to the destination node and storing those paths in the data structures 25. Steps 708 and 710 are similar to steps 708 and 710 in process 700 (FIG. 7).

FIG. 9 shows process flow 1000 which further refines the initial step 1002 to specify a network description as a machine-readable network diagram. In some embodiments, the network description is the data file created when a drawing is made by commercial-off-the-shelf (COTS) drafting software such as VISIO from Microsoft Corporation. In a preferred embodiment, the autocoder may be created 803 using a COTS macrocode facility provided with the COTS drafting software. For example, VISIO includes a Visual Basic for Applications macrocode facility which is suitable for writing an autocoder. When a network diagram 14 (FIG. 1) is finished in VISIO, it can be immediately autocoded by using an autocoder produced using the macrocode facility. The remaining steps of process 1000 are known from process 700 (FIG. 7) and process 800 (FIG. 8).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of disambiguating data elements, comprising the steps of:

transmitting by exception said data elements over at least one linear path of linked nodes in a multi-path, multi-tiered communications network of linked nodes from at least one originating node of the network to a destination node, each properly functioning network node operable to transmit unique counter data and a data element having a unique identifier;

receiving said unique counter data from each said properly functioning network node;

receiving at least one said unique identifier from a user;

detecting for said received unique counter data from each said network node forming at least one possible said linear path to said destination node from a particular network node intended to originate said data element having said unique identifier; and indicating as unambiguous said data element having said unique identifier if said counter data has been received from each said network node forming said at least one possible path within an interval of time greater than or equal to the period of a highest frequency counter in said at least one possible path and less than or equal to the period of a lowest frequency counter in said at least one possible path.

2. The method of claim 1, wherein the step of detecting for said received unique counter data further comprises the step of searching a data structure associating each designed said linear path with each said network node included in said linear path.

3. The method of claim 2, wherein the step of searching said data structure comprises the step of searching a data structure autocoded from machine-readable data relating to said network.

4. The method of claim 2, wherein the step of detecting for said received unique counter data further comprises the step of producing an indicator of reception of said unique counter data.

5. The method of claim 4, wherein the step of producing an indicator of reception of said unique counter data comprises storing said indicator in said data structure autocoded from machine-readable data relating to said network.

6. The method of claim 5, wherein the step of storing said indicator comprises associating said indicator of reception of said unique counter data with data relating to a particular node originating said unique counter data.

7. The method of claim 6, wherein said network further comprises a properly functioning node inoperable to transmit said unique counter data, further comprising the step of setting to a constant said indicator of reception of said unique counter data for said node inoperable to transmit said unique counter data.

8. The method of claim 1, further comprising the step of indicating as ambiguous said data element having said unique identifier if said step of detecting determines there is no said linear path for which said unique counter data has been received from each said network node forming said linear path.

9. The method of claim 1, wherein the step of indicating comprises the step of supplying only unambiguous data to said user.

10. The method of claim 1, wherein the step of indicating comprises the step of supplying to said user a particular indicator of ambiguity associated with a particular data element.

11. The method of claim 1, further comprising designating a particular data element to be said counter.

12. A method of conditioning data including at least one data element to be transmitted by exception over at least one linear path of linked nodes in a multi-path, multi-tiered communications network of linked nodes to a destination node from a particular linked node operable to originate said at least one data element, said linked nodes each including a counter for producing unique counter data indicative of successful operation of said node, the method comprising the steps of:

determining from said unique counter data whether said at least one complete path from said particular linked node to said destination node exists; and associating a first indicator with said at least one particular data element for which said at least one complete path exists within an interval of time greater than or equal to the period of a highest frequency counter in said at least one complete path and less than or equal to the period of a lowest frequency counter in said at least one complete path.

13. The method of claim 12, further comprising the step of associating a second indicator with said at least one particular data element for which no complete path exists.

14. The method of claim 12, further comprising the step of finding each designed path from each said linked node to said destination node in machine-readable data representing said network.

15. The method of claim 14, wherein the step of finding said each designed path further comprises the step of storing data representing said designed paths in a machine-searchable data structure.

16. The method of claim 12, wherein said step of determining comprises the step of, for said particular data element, finding at least one possible linear path to said destination node from said particular linked node originating said particular data element, inclusive.

17. The method of claim 16, wherein the step of finding at least one possible linear path further comprises the step of searching a data structure containing each designed path.

18. The method of claim 17, wherein the step of searching said data structure containing said each designed path comprises the step of searching a data structure auto-coded from data related to said network.

19. The method of claim 18, wherein the step of searching said data structure further comprises the step of searching a data structure compiled together with a data disambiguation computer program.

20. The method of claim 19, wherein the step of searching said data structure compiled together with said data disambiguation computer program comprises the step of searching a data structure auto-coded together with said data disambiguation computer program.

21. The method of claim 16, wherein said step of determining further comprises the step of, for each possible path, searching for said counter data associated with each said node comprising each said possible path.

22. The method of claim 21, wherein said step of searching for said counter data comprises the step of updating said data structure with indicators of reception of counter data based on counter data received at said destination node.

23. A method of disambiguating data in a multi-path, multi-tier communications network, comprising the steps of:

transmitting by exception at least one data element from at least one data source node toward a destination node over at least one path of said multi-path network, said path including a combination of said data source node, at least one relay node, and said destination node, said at least one data element having a value associated with a data element name, wherein each said node has a counter, each said counter operable to produce a counter data stream having a frequency when said each node is functioning properly;

transmitting a counter data stream from each properly functioning node of said at least one path towards said destination node; and associating an unchanging data element with a first indicator when any of said counter data streams originating from said nodes comprising said at least one path are not received at said destination node within an interval of time greater than or equal to the period of a highest frequency counter in said at least one path and less than or equal to the period of a lowest frequency counter in said at least one path.

24. The method of claim 23, further comprising the step of associating an unchanging data element with a second indicator when said counter data streams originating from each of said nodes comprising said at least one path are received at said destination node.

25. The method of claim 23, wherein said properly functioning node originates a plurality of data streams and said counter data stream comprises a data stream selected from among said plurality of data streams and transmitted regardless of changes in said data stream.

26. The method of claim 23, further comprising the step of determining a plurality of possible paths in said multi-path network.

27. The method of claim 26, wherein the step of determining comprises using processor instructions auto-coded from a machine-readable representation of said multi-path, multi-tier communications network.

28. The method of claim 26, further comprising the step of examining each said counter data stream from each said node in at least one said possible path of said plurality of possible paths to determine whether a complete path exists.

29. The method of claim 23, wherein the step of associating comprises the step of associating within an average time less than the period of the lowest frequency counter in said at least one path.

30. An apparatus for improving the actions taken by an integrated vehicle health management system (IVHMS) by resolving ambiguities in vehicle telemetry data caused by communications network anomalies in a multi-path, multi-tier communications network having a plurality of source nodes linked to a plurality of relay nodes and a linked destination node, wherein said telemetry data includes at least one telemetry data element transmitted over the network through at least one linked relay node of said plurality of linked relay nodes, each said node having a counter, each counter operable to produce counter data when said node is operable, the apparatus comprising:
 a processor;
 a memory coupled to said processor;
 a telemetry disambiguation program residing in said memory and executable in said processor to:
   periodically update indicators relating to said counter data received from each said operable node based upon whether each related stream of said counter data received at said destination node is currently changing;
   receive a telemetry data name from a user; and
   respond to said telemetry data name and to said indicators relating to said changing counter data to disambiguate said telemetry data element within an interval of time greater than or equal to the period of a highest frequency counter in each of said related stream of said counter data and less than or equal to the period of a lowest frequency counter in each of said related stream of said counter data.

31. The apparatus of claim 30, wherein said user is said IVHMS.

32. The apparatus of claim 31, wherein said IVHMS is operable to change a vehicle state vector in response to said disambiguated telemetry.

33. The apparatus of claim 30, wherein said processor comprises a processor coupled to said destination node.

34. The apparatus of claim 30, further comprising network data structures residing in said memory, said data structures configured to associate each said indicator with a particular node originating said counter data to which said indicator relates.

35. The apparatus of claim 30, wherein said telemetry disambiguation program further comprises instructions executable to find in said network data structures, responsive to said telemetry data element name, at least one said indicator relating to said counter data from each said node.

* * * * *